United States Patent
Yu et al.

(10) Patent No.: US 9,369,228 B2
(45) Date of Patent: Jun. 14, 2016

(54) METHOD AND APPARATUS FOR HETERODYNE COHERENT DETECTION

(71) Applicant: ZTE (USA) INC., Richardson, TX (US)

(72) Inventors: Jianjun Yu, Basking Ridge, NJ (US); Ze Dong, Morristown, NJ (US); Hung-Chang Chien, Bridgewater, NJ (US)

(73) Assignee: ZTE (USA) Inc., Austin, TX (US)

( * ) Notice: Subject to any disclaimer, the term of this patent is extended or adjusted under 35 U.S.C. 154(b) by 301 days.

(21) Appl. No.: 13/966,845

(22) Filed: Aug. 14, 2013

(65) Prior Publication Data

US 2014/0050233 A1 Feb. 20, 2014

Related U.S. Application Data

(60) Provisional application No. 61/683,028, filed on Aug. 14, 2012.

(51) Int. Cl.
| | |
|---|---|
| *H04B 10/06* | (2006.01) |
| *H04J 14/08* | (2006.01) |
| *H04J 14/02* | (2006.01) |
| *H04J 14/06* | (2006.01) |
| *H04B 10/61* | (2013.01) |
| *H04B 10/64* | (2013.01) |

(52) U.S. Cl.
CPC ............. *H04J 14/08* (2013.01); *H04B 10/614* (2013.01); *H04B 10/64* (2013.01); *H04J 14/02* (2013.01); *H04J 14/06* (2013.01)

(58) Field of Classification Search
CPC ........... H04J 14/02; H04J 14/06; H04J 14/08; H04B 10/614; H04B 10/60; H04B 10/613; H04B 10/61; H04B 10/611; H04B 10/63; H04B 10/64

USPC ................................ 398/202–205, 65, 79, 87
See application file for complete search history.

(56) References Cited

U.S. PATENT DOCUMENTS

| | | | | |
|---|---|---|---|---|
| 7,209,664 | B1* | 4/2007 | McNicol | H04B 10/50 375/219 |
| 7,330,657 | B2* | 2/2008 | Davidson | H04J 14/02 359/15 |
| 7,526,211 | B2* | 4/2009 | Mcnicol | H04B 10/50 398/128 |
| 7,724,991 | B1* | 5/2010 | Doerr | G02B 6/12004 385/14 |
| 8,861,977 | B2* | 10/2014 | McNicol | H04J 14/02 398/201 |
| 8,873,963 | B2* | 10/2014 | Handelman | H04J 14/02 398/135 |
| 8,903,238 | B2* | 12/2014 | Pfau | H04J 14/06 398/152 |
| 2010/0021166 | A1* | 1/2010 | Way | H04J 14/02 398/79 |
| 2012/0170931 | A1* | 7/2012 | Evans | H04J 14/0227 398/48 |
| 2012/0251111 | A1* | 10/2012 | Xu | H04J 14/06 398/65 |
| 2012/0251120 | A1* | 10/2012 | McNicol | H04B 10/506 398/91 |
| 2012/0251121 | A1* | 10/2012 | McNicol | H04J 14/02 398/91 |
| 2014/0241722 | A1* | 8/2014 | Xie | H04B 10/532 398/65 |

* cited by examiner

*Primary Examiner* — Hibret Woldekidan
(74) *Attorney, Agent, or Firm* — Drinker Biddle & Reath LLP

(57) ABSTRACT

A simplified coherent receiver based on heterodyne detection with only two balanced photo detectors (PD) and two analog-to-digital converters (ADC) is disclosed. The polarization diversity hybrid can be simplified relative to the conventional one. The detected intermediate frequency signals are first down converted to baseband with I/Q separation.

8 Claims, 4 Drawing Sheets

METHOD AND APPARATUS FOR HETERODYNE COHERENT DETECTION

CROSS-REFERENCE TO RELATED APPLICATIONS

The present application claims benefit to U.S. Provisional Application No. 61/683,028, filed Aug. 14, 2012.

BACKGROUND OF THE INVENTION

With the development of electronic analog-to-digital converter (ADC) and photo detectors (PD) in bandwidth and speed, coherent detection with digital signal processing (DSP) has been attracting a great deal of interest again in recent years [1-4]. Thanks to DSP technology, optical transmission impartments can be equalized in electrical domain [2]. Homodyne detection has been discussed and investigated a lot in recent coherent communication system due to DSP in electrical domain [1-4]. However, inphase and quadrature (I/Q) signals should be separated in optical domain with full information. In this way, 4 balanced detectors with double hybrid structures and 4 channels ADCs are required.

Heterodyne coherent detection can simplify the coherent receiver with only half of the PDs and ADCs [1, 5]. The optical hybrid can be also simplified. However, this technique is limited by the bandwidth of PDs or ADCs which should have wider bandwidth for intermediate frequency (IF) signals. Thanks to the development of the PDs and ADCs, it gives a possibility to achieve a simplified coherent receiver with heterodyne detection, which has been investigated in subcarrier multiplexing system [6, 7] and radio over fiber system [8]. The most recent report on heterodyne detection is a limited 5 Gb/s 4 QAM signal over 20 km in [6] and limited 20 Mbaud 64 and 128 QAM over 525 km in [7].

BRIEF SUMMARY OF THE INVENTION

In this disclosure, we propose and experimentally demonstrate a simplified coherent receiver based on heterodyne detection with only two balanced photo detectors (PD) and two ADCs. The polarization diversity hybrid can be simplified relative to the conventional one. The detected intermediate frequency signals are first down converted to baseband with I/Q separation.

DETAILED DESCRIPTION OF THE INVENTION

Figures 1A, 1B:
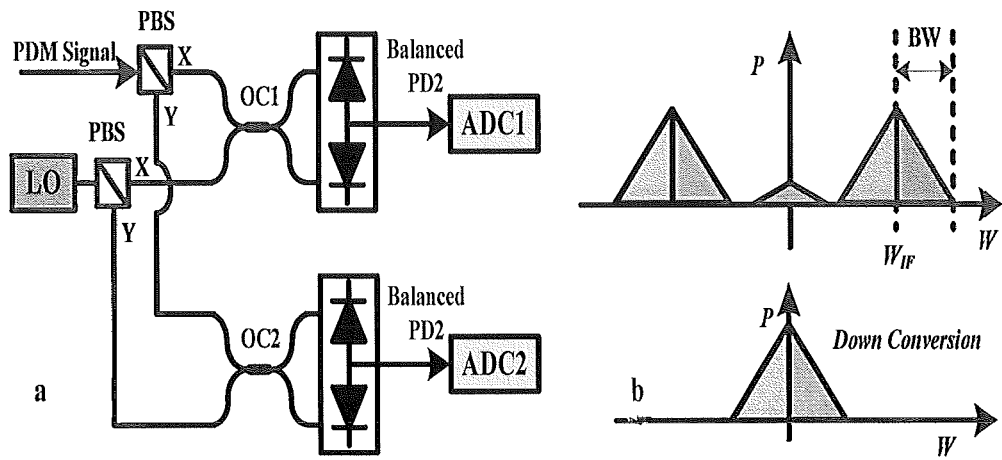
FIG. 1(a) shows the principle of simplified coherent receiver with heterodyne detection.
FIG. 1(b) also shows the principle of simplified coherent receiver with heterodyne detection.

FIG. 1 shows the principle of proposed simplified coherent receiver with heterodyne detection. The proposed coherent receiver consists of two polarization beam splitter (PBS) for PDM signal and LO polarization diversity splitting, two optical couplers (OC) and two balanced PDs. We can see that only two balanced receivers and ADCs are needed. The polarization diversity hybrid is also simplified relative to conventional one. The I/Q signals are received at the same time at the intermediate frequency (IF) as shown in FIG. 1 (b). Here, the LO has a large frequency offset of $f_{IF}=f_S-f_{LO}$ to the signal and BW is the bandwidth of baseband signal. The IF signal can be down converted to base band in the electrical domain. After polarization splitter, the signal of one polarization can be expressed as $$E_S = \sqrt{P_S} \exp[j2\pi f_S t + \phi_S(t)] \qquad (1)$$

where $f_S$ is the optical frequency of signal, Ps is the signal power, and $\phi_s$ is phase information of signal. The LO can be also expressed as $$E_{LO} = \sqrt{P_{LO}} \exp[j2\pi f_{LO} t + \phi_{LO}(t)] \qquad (2)$$

where $f_{LO}$ is the optical frequency of LO, $P_{LO}$ is the power, and $\phi_{LO}$ is phase of LO. After the balanced photo detection, the alter-current (AC) from the balanced PDs without direct current (DC) part can be expressed as $$I_{BPD} = 2R\sqrt{P_S P_{LO}} \cos[2\pi f_{IF} t + \phi_S(t) - \phi_{LO}(t)] \qquad (3)$$

where R is the detector responsivity, and $f_{IF}=f_S-f_{LO}$ is IF or frequency offset of the LO and signal. The output current of balanced PD for the other polarization is similar to Eq. 3. For heterodyne detection with only two balanced PDs, in order to separate the I and Q part without crosstalk, the IF should $f_{IF} \geq B_W$. Otherwise, it is not possible to separate I and Q part with only two balanced PDs without crosstalk. As analyzed in [5], assuming the $\zeta$ is the noise density of signal, the SNR for heterodyne detection is $$SNR_{He} = \frac{S_{He}}{N_{He}} = \frac{2 \times 0.5 \, I_{BPD}^2}{2B_W \zeta} = 2P_S P_{LO} R^2 / B_W \zeta \qquad (4)$$

However, for homodyne detection, a conventional 4*90° hybrid is needed with $f_{IF}=f_S-f_{LO}=0$. In this way, the I or Q part of signal can be expressed as $$I_{BPD\_i/q} = 2R\sqrt{P_S P_{LO}} \cos[\phi_S(t) - \phi_{LO}(t)] \qquad (5)$$

Figure 2:
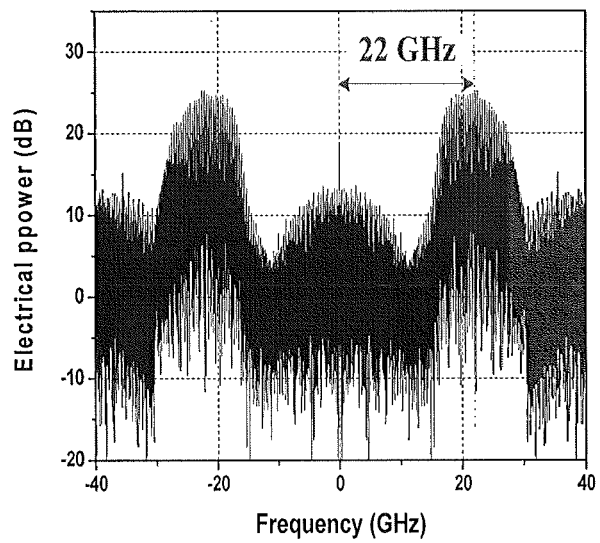
FIG. 2 shows the electrical spectrum of received IF signals with 22 GHz frequency offset after balanced detector and band-pass EA.

In this way, the SNR for homodyne detection is [5]

$$SNR_{Ho} = \frac{S_{Ho}}{N_{Ho}} = \frac{I_{BPD\_i/q}^2}{B_W \zeta} = 4P_S P_{LO} R^2 / B_W \zeta \qquad (6)$$

which shows 3 dB SNR improvement compared with heterodyne detection. However, the homodyne detection cannot use the simplified 180° optical hybrid and only two balanced PDs and ADCs without destroying the I/Q information. FIG. 2 shows the electrical spectrum after heterodyne coherent detection when the LO is 22 GHz away from the detected channel.

Figure 3:
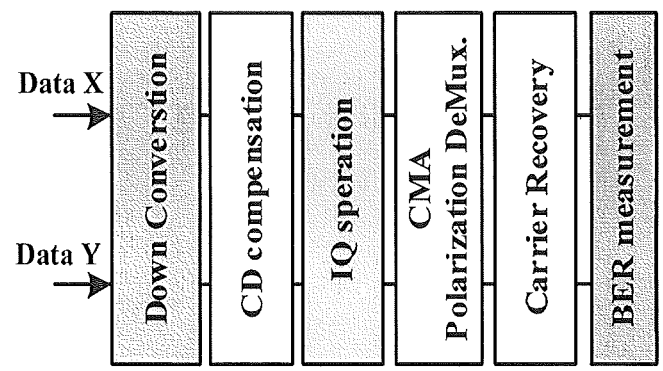
FIG. 3 shows digital signal processing for received signals after ADCs.
Figure 4:
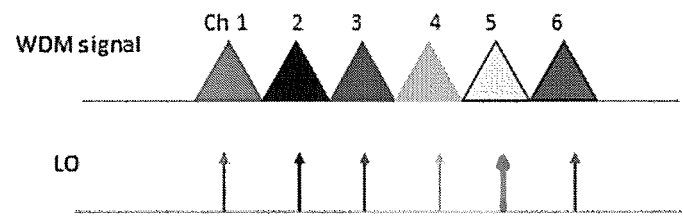
FIG. 4 shows homodyne coherent detection.
Figure 5:
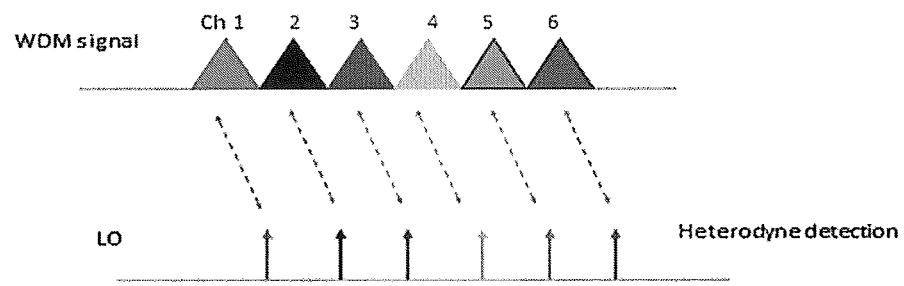
FIG. 5 shows heterodyne coherent detection (regular scheme).
Figure 6:
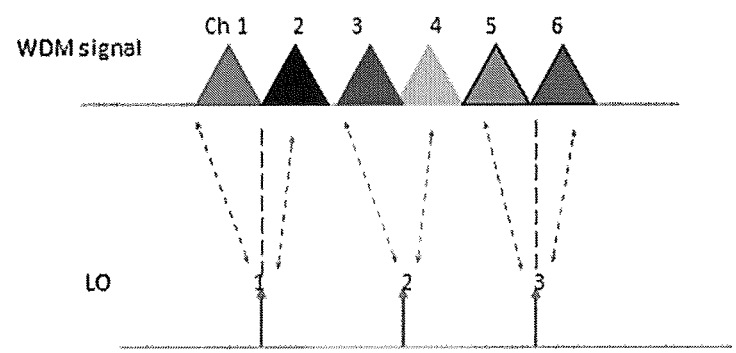
FIG. 6 shows heterodyne coherent detection with the proposed scheme.
Figure 7:
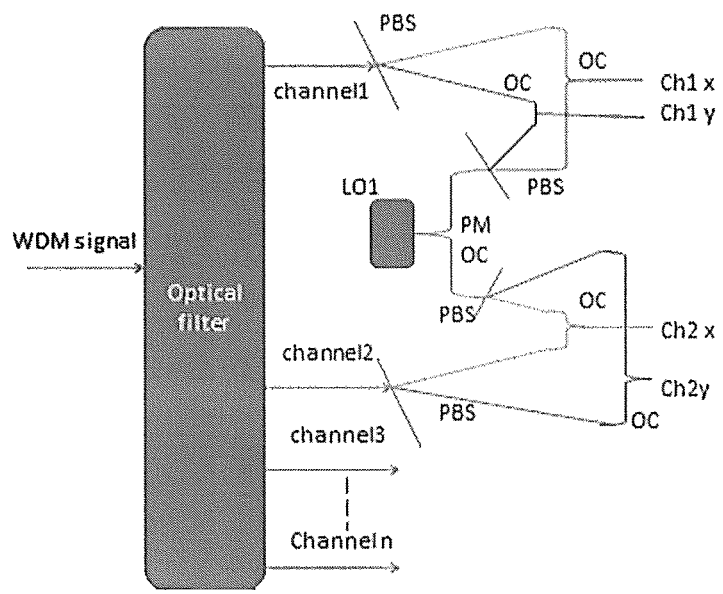
FIG. 7 shows details of heterodyne coherent detection.

FIG. 3 shows the offline digital signal processing for received signals after ADCs. The received signals are first down converted to baseband by frequency shifting. The compensation of chromatic dispersion (CD) is based on the known fiber CD transfer function in frequency-domain as the next step. The I/Q is separated as the subsequent step before the polarization de-multiplexing. Two complex-valued, 13-tap, T/2-spaced adaptive FIR filters, based on the classic constant modulus algorithm (CMA), are used to retrieve the modulus of the PDM-QPSK signal. The carrier recovery is performed in the subsequent step, where the 4-th power is used to estimate the frequency offset between the LO and the received optical signal. After frequency offset compensation, the phase recovery is obtained from the speed of the phase rotation using the 4th-power algorithm. Finally, differential decoding is used for bit-error-rate (BER) calculating after decision.

Homodyne Coherent Detection

Each WDM channel needs one individual local oscillator (LO) laser. For example, six WDM channels need six LO lasers. Usually the center wavelength of the LO should be equal to the center wavelength of the matched channel.

Heterodyne Coherent Detection (Regular Scheme)

For heterodyne coherent detection, the LO laser should be set some distance away from the center wavelength of the matched WDM channel. Each WDM channel should have one Individual LO laser as shown in the figure.

Heterodyne Coherent Detection with Proposed Scheme

In the proposed new scheme, we will reduce number of the LO laser. Here we use one LO laser for two different WDM channels. Such as LO 1 is used for channel 1 and channel 2. Here the wavelength of the LO1 is in the middle wavelength of channel 1 and channel 2. By this way we can reduce the number of the LO lasers. For example, if channel spacing of the WDM channel is 25 GHz, we will set each LO is 12.5 GHz away the neighboring WDM channels. If the center frequency of ch1 and ch 2 is f and f+25, then LO frequency is f+12.5 GHz.

As one example, we show heterodyne coherent channel 1 and 2. The WDM signals are demultiplexed by using one optical filter such as arrayed waveguide grating filter, WDM filter, or other optical filter. Here the heterodyne architecture is quite normal, not special. For example the polarization multiplexed channel 1 is divided into two parts by one optical polarization beam splitter, then we combine X or Y polarization component of LO1 by using one optical coupler before they are detected by a photodiode. Channel 1 and channel 2 share the LO1. Here the lightwave from LO1 is divided into two parts by using one polarization maintaining optical coupler (PM OC), and the wavelength of LO1 is the middle wavelength of the center wavelength of channel 1 and 2.

It should be understood that the methods and devices of the present invention may be executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EEPROM's); and the like. Implementations of certain embodiments may further take the form of machine-implemented, including web-implemented, computer software.

Many modifications and alterations of the new methods and systems described herein may be employed by those skilled in the art without departing from the spirit and scope of the invention which is limited only by the claims.

REFERENCES

E. Ip, A. P. T. Lau, D. J. F. Barros, J. M. Kahn, Opt. Express 16, 753-791 (2008)

S. J. Savory, J. of Selected Topics in Quantum Electronics, 16, 1164-1179 (2010)

X. Zhou, J. Yu, J. Lightw. Technol., 27, 3641-3653 (2009)

J. Yu, Z. Dong, H. Chien, Y., and N. Chi., IEEE Photon. Technol. Lett., 24, 264-266 (2012)

L. G. Kazovsky, J. Opt. Commun 1, 18-24 (1985)

R. Zhu, K. Xu, Y. Zhang, Y. Li, J. Wu, X. Hong, J. Lin, in Proc. Of APMP, 165-168 (2008)

M. Nakazawa, M. Yoshida, K. Kasai and J. Hongou. Electronic Lett. 42, 12 (2006)

X. Pang, A. Caballero, A. Dogadaev, IEEE Photonics Journal, vol. 4, no. 3, pp. 691-698, 2012.

What is claimed is:

1. A method of detecting an optical signal, the method comprising:
    demultiplexing, by at least one optical filter, a wavelength-division multiplexed (WDM) optical signal that comprises a plurality of multiplexed data-bearing optical signals of different wavelengths, into the plurality of data-bearing optical signals of different wavelengths;
    splitting, by at least one beam splitter, each of the plurality of data-bearing optical signals into respective polarization components carrying respective data and having a center wavelength;
    applying a lightwave from exactly one local oscillator (LO) to the respective polarization components of at least two of the plurality of data-bearing optical signals of different wavelengths to create respective mixed polarization components, wherein the LO wavelength is halfway between the center wavelengths of two of the plurality of data-bearing optical signals of different wavelengths; and
    detecting, by at least one photodiode, the respective mixed polarization components.

2. The method of claim 1, wherein the at least one optical filter comprises one of a group of: an arrayed waveguide grating filter and a wave division multiplexed filter.

3. The method of claim 1, further comprising dividing, by an optical coupler, the LO lightwave into two parts, wherein one of the two parts is applied to each of the at least two data-bearing optical signals of different wavelengths to create respective mixed polarization components.

4. The method of claim 3, wherein the optical coupler is a polarization maintaining optical coupler.

5. A system for detecting an optical signal, the system comprising:
    at least one optical filter configured to demultiplex wavelength-division multiplexed (WDM) optical signal that comprises a plurality of multiplexed data-bearing optical signals of different wavelengths, into the plurality of data-bearing optical signals of different wavelengths;
    at least one beam splitter configured to split each of the plurality of data-bearing optical signals into respective polarization components carrying respective data and having a center wavelength;
    exactly one local oscillator (LO) configured to apply a lightwave to the respective polarization components of at least two of the plurality of data-bearing optical signals of different wavelengths to create respective mixed polarization components, wherein the LO wavelength is halfway between the center wavelengths of two of the plurality of data-bearing optical signals of different wavelengths; and
    at least one photodiode configured to detect the respective mixed polarization components.

6. The system of claim 5, wherein the at least one optical filter comprises one of a group of: an arrayed waveguide grating filter and a wave division multiplexed filter.

7. The system of claim 5, further comprising dividing, by an optical coupler, the LO lightwave into two parts, wherein one of the two parts is applied to each of the at least two data-bearing optical signals of different wavelengths to create respective mixed polarization components.

8. The system of claim 7, wherein the optical coupler is a polarization maintaining optical coupler.

* * * * *